No. 870,763. PATENTED NOV. 12, 1907.
F. W. CHAFFEE.
HOSE BAND.
APPLICATION FILED NOV. 6, 1906.
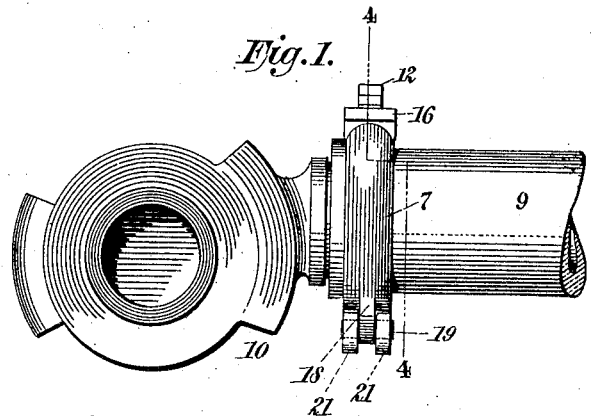
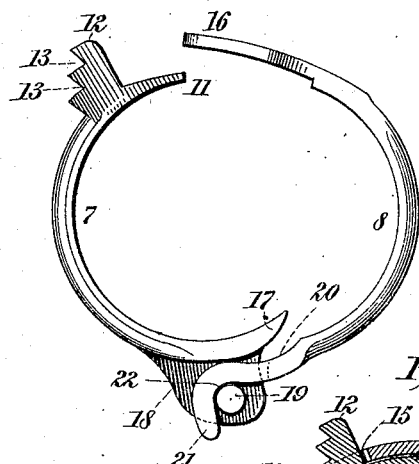
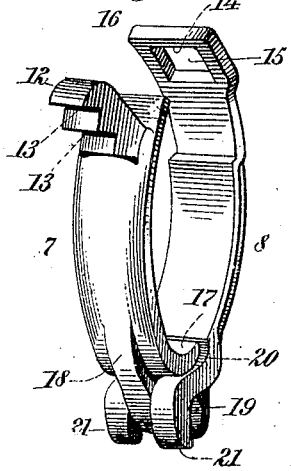
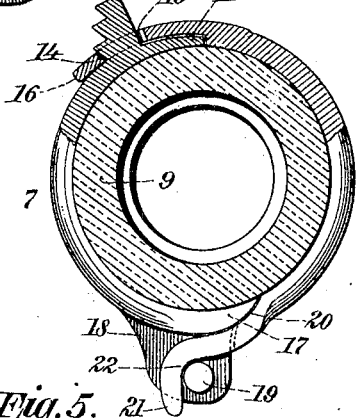
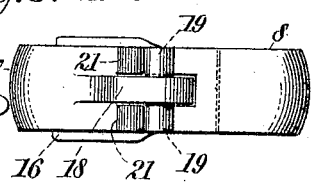
WITNESSES:
Gustave Dieterich
Edwin K Dieterich
INVENTOR
Frank W. Chaffee
BY Chas. E. Gill
ATTORNEY

UNITED STATES PATENT OFFICE.

FRANK W. CHAFFEE, OF ALBANY, NEW YORK.

HOSE-BAND.

No. 870,763. Specification of Letters Patent. Patented Nov. 12, 1907.

Application filed November 6, 1906. Serial No. 342,189.

*To all whom it may concern:*

Be it known that I, FRANK W. CHAFFEE, a citizen of the United States, and a resident of Albany, in the county of Albany and State of New York, have invented certain new and useful Improvements in Hose-Bands, of which the following is a specification.

The invention relates to improvements in hose-bands, and it consists in the novel features and structure hereinafter described, and particularly pointed out in the claims.

The object of the invention is to produce a thoroughly durable and efficient two-piece band for securing the end of hose to a coupling or ferrule.

My invention pertains more particularly to hose-bands of the character required for securing the end of hose, used for air or steam, to hose-couplings, and especially for securing the ends of hose to the usual hose-couplings employed intermediate the adjoining ends of railway-cars.

I present my invention herein as embodied in a two-piece hose-band employing at the locking ends of the band the features described in Letters Patent No. 673,382 granted to me May 7, 1901 for an improvement in hose-bands.

The present invention resides more particularly in a novel construction whereby the band may be made in two parts capable of being jointed together in a hinged manner, the features of the hinge-joint being new and of great advantage and the band possessing them being adapted to be closed around the hose without, at said joint, pinching and injuring the same.

The invention will be fully understood from the detailed description hereinafter presented, reference being had to the accompanying drawings, in which:

Figure 1 is a side elevation of a piece of hose applied to a hose-coupling by means of a hose-band constructed in accordance with and embodying my invention; Fig. 2 is an enlarged detached side elevation of the hose-band, the two parts thereof being shown as jointed together; Fig. 3 a perspective view of same; Fig. 4 a vertical transverse section, through the hose and band, on the dotted line 4—4 of Fig. 1, and Fig. 5 a detached edge view of the band.

In the drawings 7, 8, respectively, designate the two parts or members of the hose-band, 9 the hose and 10 a coupling of known form and construction, the band being of substantial width and thickness and preferably formed of cast metal. The outer end of the member 7 is formed with a tongue 11, and outwardly projecting lug 12, the latter having a straight edge adjacent to the tongue 11, while its outer edge is on an inclined plane and formed with recesses 13 adapted when the hose band is in use to receive the outer wall 14 of the opening 15 formed in the head 16, which is upon the outer end of the member 8.

The tongue 11, lug 12, opening 15 and head 16 are substantially identical in construction and operation with corresponding features shown in my aforesaid Letters Patent dated May 7th, 1901 and are not separately claimed herein; nor is the present application limited to the said specific interlocking features for securing the band upon the hose.

The inner end of the band-member 7 is formed with a tongue 17 and lug 18, the latter projecting centrally from the outer face of the inner end portion of said member 7 and being less in width than said member and carrying upon its opposite faces studs 19 which extend transversely of the band and together form, in effect, a transverse pin.

The member 8 of the hose band is formed at its inner end with the concave recess 20 to receive the lower convex surface of the tongue 17, as indicated more clearly in Fig. 4, and said end of said member 8 is bifurcated to form the fingers 21 which straddle the lug 18 and are curved, as at 22, to pass upon and partly around the studs 19 and become hooked thereon.

In assembling the two parts of the band the member 8 is turned downwardly so that its inner end may be uppermost and the fingers 21 are then passed upon the lug 18 between the body of the member 7 and pins 19, and thereupon said fingers are worked inwardly around the studs 19 and the member 8 gradually turned upwardly on the arc of a circle struck from said studs, until the members 7, 8 assume their band-like relation to each other. When the band is securely clamped around the hose and at its outer ends locked together by the depression of the head 16 over the lug 12 and the engagement of the wall 14 with the wall of one of the recesses 13, the interior of the band presents a substantially smooth surface owing to the fact that the tongue 17 sets within the recess 20, as shown in Fig. 4, and at this time, the curved fingers 21 bear with their upper surfaces against the outer inner end portion of the member 7 and also against the outer sides of the studs 19, whereby the two parts of the band become securely fastened together.

The present invention resides more particularly in the construction provided at the inner ends of the members 7, 8 for conveniently and effectually connecting said ends, and the construction I have hereinbefore described for that purpose is particularly durable and efficient, as is required owing to the uses to which the hose-bands are put in their employment on railway cars. The presence of the tongue 17 on the member 7 and the recess 20 on the member 8 enables the production of a smooth interior surface in the band for engagement with the hose, and the fact that the tongue 17 extends beyond the lug 18 so as to lap upon the member 8 beyond the axial hinging point of the members, is important in that by reason thereof I avoid the creating of abutting surfaces at the hinge liable to pinch the hose between them when the said members are closed tightly together. In the present instance the member 7 is fitted against the hose, and the application of the member 8 is by reason of the hinge construction presented, in an upwardly direction and substantially in a direct radial line against the surface of the hose, whereby there is no tendency to pinch the hose at the line where the inner end portions of the band-members 7, 8 engage each other. The lug 18 and studs 19 are integral with the member 7 and the fingers 21 are integral with the member 8, and said fingers 21 extend outwardly from the band, whereby they are enabled to resist extreme internal pressure, said fingers being secured between and bearing against the studs 19 and outer surfaces of the member 7 at opposite sides of the lug 18.

The construction as a whole has been produced with the view of securing great durability and efficiency and convenience in applying the members of the band to each other and to the hose.

What I claim as my invention and desire to secure by Letters-Patent, is:

1. A hose-band comprising parts 7, 8 having at their outer ends respectively rigid integral locking members for firmly locking one of said ends upon the other and at their inner ends means for connecting said parts together and comprising on one part a tongue 17 and outwardly projecting lug 18 having transverse studs 19 and on the other part a recess to receive said tongue and fingers 21 to straddle said lug and pass upon and engage said studs; substantially as set forth.

2. A hose-band comprising parts 7, 8 having at their outer ends respectively rigid integral locking members for firmly locking one of said ends upon the other and at their inner ends means for connecting said parts together and comprising on one part a tongue 17 and outwardly projecting lug carrying a transverse pin and on the other part a recess to receive said tongue and a curved part to pass between said pin and its band member and extend outwardly in hook fashion from the band and along the outer side of said pin; substantially as set forth.

Signed at Albany, in the county of Albany and State of New York this third day of November A. D. 1906.

FRANK W. CHAFFEE.

Witnesses:
CHAS. S. DU BOIS,
W. R. MCMUNN.